(12) United States Patent
Schmidt

(10) Patent No.: US 11,262,716 B2
(45) Date of Patent: Mar. 1, 2022

(54) METHOD FOR THE PARAMETERIZATION OF A SENSOR

(71) Applicant: SICK AG, Waldkirch/Breisgau (DE)

(72) Inventor: Fabian Schmidt, Teningen (DE)

(73) Assignee: SICK AG, Waldkirch/Breisgau (DE)

( * ) Notice: Subject to any disclaimer, the term of this patent is extended or adjusted under 35 U.S.C. 154(b) by 554 days.

(21) Appl. No.: 16/025,481

(22) Filed: Jul. 2, 2018

(65) Prior Publication Data
US 2019/0011890 A1 Jan. 10, 2019

(30) Foreign Application Priority Data
Jul. 4, 2017 (EP) .................................... 17179587

(51) Int. Cl.
*G05B 19/042* (2006.01)
*G06F 13/42* (2006.01)
*G06N 20/00* (2019.01)

(52) U.S. Cl.
CPC ....... *G05B 19/042* (2013.01); *G06F 13/4282* (2013.01); *G06N 20/00* (2019.01); *G05B 2219/25124* (2013.01); *G06F 2213/0042* (2013.01)

(58) Field of Classification Search
None
See application file for complete search history.

(56) References Cited

U.S. PATENT DOCUMENTS

| 4,799,559 A * | 1/1989 | Murdter ................. G01D 18/00 177/124 |
| 8,910,871 B1 * | 12/2014 | Powell ............... G06K 7/10881 235/462.07 |
| 2009/0048705 A1 * | 2/2009 | Nubling ................. G01B 11/04 700/228 |
| 2013/0185013 A1 * | 7/2013 | Wagner .................... G01D 3/08 702/104 |

(Continued)

FOREIGN PATENT DOCUMENTS

| DE | 102015113979 A1 | 3/2017 |
| EP | 2026033 A1 | 8/2007 |

(Continued)

OTHER PUBLICATIONS

Communication from the Japanese Patent Office dated Sep. 3, 2019 corresponding to application No. 2018-126296.

(Continued)

*Primary Examiner* — Jason Lin
(74) *Attorney, Agent, or Firm* — Nath, Goldberg & Meyer; Jerald L. Meyer

(57) ABSTRACT

The invention relates to a method for the dynamic parameterization of at least one sensor in an industrial process in which
measurement data of the process are acquired by means of a configuration sensor and of a productive sensor, with the configuration sensor and the productive sensor being sensors of the same kind;
the measurement data are transmitted to a control unit;

(Continued)

the control unit generates a parameter set for the productive sensor with reference to the measurement data and transmits the parameter set to the productive sensor; and the productive sensor uses the parameter set in operation.

16 Claims, 1 Drawing Sheet

(56) References Cited

U.S. PATENT DOCUMENTS

| | | | |
|---|---|---|---|
| 2014/0278144 A1* | 9/2014 | Risk | G01D 18/008 702/24 |
| 2015/0347607 A1* | 12/2015 | Gredegard | G01D 18/008 707/758 |
| 2016/0274557 A1* | 9/2016 | Froehner | G05B 19/0426 |
| 2017/0146375 A1* | 5/2017 | Luo | G01D 18/008 |
| 2018/0210429 A1* | 7/2018 | Jundt | H04L 67/12 |
| 2018/0316555 A1* | 11/2018 | Salgueiro | G06N 20/00 |

FOREIGN PATENT DOCUMENTS

| | | |
|---|---|---|
| EP | 2026033 A1 | 2/2009 |
| EP | 3070556 A1 | 9/2016 |
| JP | 2010-15321 A | 1/2010 |
| JP | 2016-192034 A | 11/2016 |
| JP | 2017-97839 A | 6/2017 |
| WO | 2012110089 A1 | 8/2012 |
| WO | 2012175120 A1 | 12/2012 |
| WO | 2015158962 A1 | 10/2015 |

OTHER PUBLICATIONS

European Patent Office Communication dated Jun. 22, 2020 corresponding to application No. 17179587.5-1010.
European Search Report dated Dec. 22, 2017.

* cited by examiner

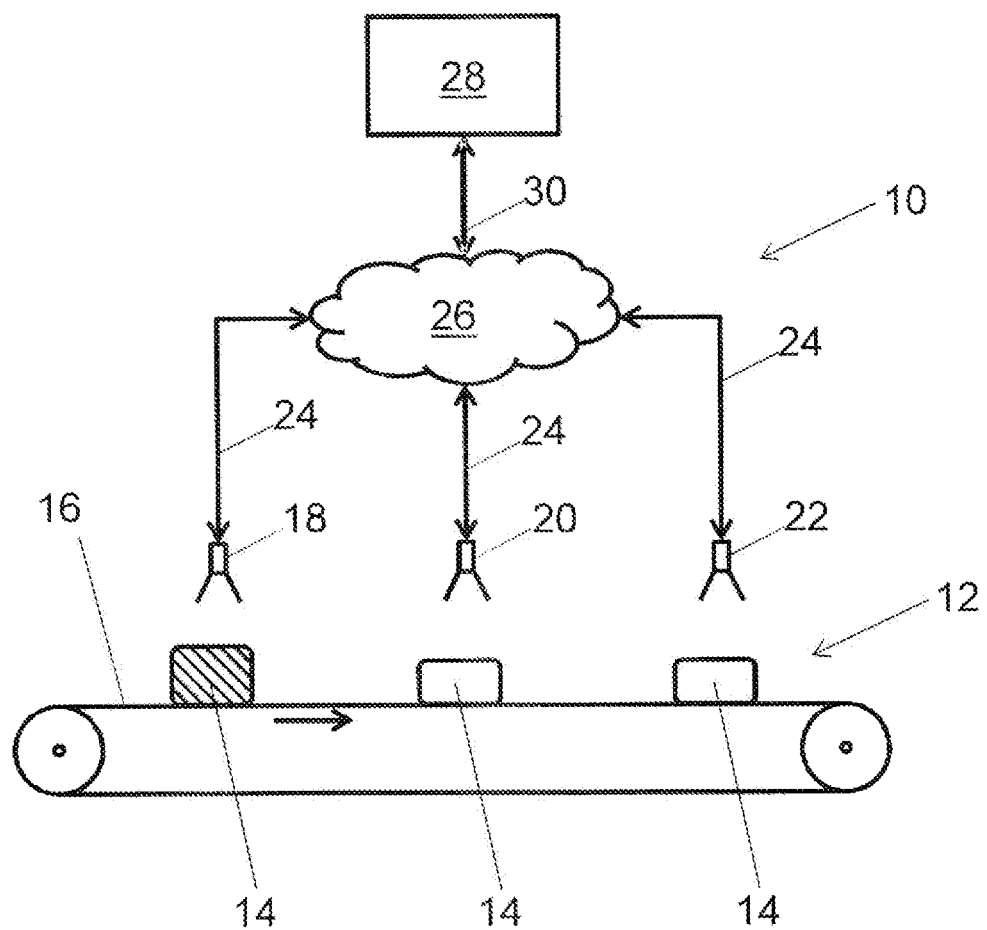

METHOD FOR THE PARAMETERIZATION OF A SENSOR

FIELD

The present invention relates to a method for the dynamic parameterization of at least one sensor in an industrial process.

BACKGROUND

In industrial process that, for example, serve for the manufacture, sorting and/or processing of workpieces or articles, a plurality of sensors are typically used that observe or detect the workpieces. Data that serve for controlling the industrial process are then collected from the measurement data of the sensors.

The parameters of the sensors (this means their configuration) are typically set once. In this setting, the parameters are adapted to the boundary conditions typically present in the industrial process. The sensor can, for example, be a camera whose exposure time is set to the typical brightness conditions and/or to the color and brightness of the workpieces to be observed. If workpieces having different colors are, for example, processed in the industrial process, the parameters of the camera are then typically set such that the camera provides satisfactory results for all possible conditions.

However, it is disadvantageous of such an approach that the setting of the parameters has to take place for a very broad possible application spectrum of the sensors such that the quality of the measurement data provided by the sensors is often in need of improvement.

SUMMARY

It is therefore the underlying object of the invention to provide a method for the parameterization of a sensor that permits an increase in the quality of the measurement data of the sensor.

The method in accordance with the invention serves for the parameterization of at least one sensor in an industrial process. In the method,
  measurement data of the process are acquired by means of a configuration sensor and of a productive sensor, with the configuration sensor and the productive sensor being sensors of the same kind;
  the measurement data at least of the configuration sensor or only of the configuration sensor are transmitted to a control unit;
  the control unit generates a parameter set for the productive sensor with reference to/based on the measurement data and transmits the parameter set to the productive sensor; and
  the productive sensor uses the parameter set in operation.

The invention uses two sensors of the same kind, namely the configuration sensor and the productive sensor, wherein the configuration sensor is connected upstream of the productive sensor. The parameterization of the productive sensor takes place with reference to the measurement data of the process determined by the configuration sensor.

A determination can e.g. be made with reference to the measurement data of the configuration sensor as to which environmental conditions are currently present in the process. Based on the environmental conditions (this means based on the present boundary conditions of the process), a configuration optimized with respect to the boundary conditions can then be used in the productive sensor. An ideal recording of the industrial process can then take place due to the optimized configuration transmitted to the productive sensor by means of the parameter set. An optimized parameter set can therefore be determined in a manner specific to the measurement object and/or with respect to the transit time. The respective ideal parameter set for the respective just present environmental conditions can be used due to the generation of the parameter set with respect to the transit time. The setting of the parameter set therefore takes place dynamically in operation to be able to react to changed environmental conditions.

The generated parameter set can additionally also be transmitted to the configuration sensor to change the settings of the configuration sensor. Alternatively, the settings of the configuration sensor can also be left unchanged.

It is therefore made possible to load different parameter sets into the productive sensor for different boundary conditions, whereby respective ideal results can also be achieved by the productive sensor with different boundary conditions. This is made possible by the configuration sensor that is arranged upstream and that permits the detection of the boundary conditions.

To determine the boundary conditions, the control unit evaluates the measurement data of the configuration sensor and generates the corresponding parameter set for the productive sensor based on the measurement data. The control unit can, for example, select the respective particularly suitable parameter set for the productive sensor from a plurality of parameter sets. The parameter set is subsequently, for example, transmitted as a digital data packet to the productive sensor. The productive sensor takes over the parameters included in the parameter set and changes its configuration accordingly. The settings of the productive sensor for observing the industrial process are then adapted to the just present boundary conditions such that the productive sensor can then provide ideal measurement data with respect to the industrial process.

Each of the sensors (i.e. the configuration sensor and the productive sensor) is coupled to the control unit, preferably by means of a digital data connection. The control unit can be configured separately and spaced apart from the sensors or it can also be integrated into one of the sensors.

For example, the configuration sensor and the productive sensor can each be a camera that serves for the recognition of a barcode, wherein the industrial process, for example, serves for the sorting of workpieces (e.g. packets) with reference to the barcode. The configuration as standard of the two sensors can be adapted to a black barcode against a white background. If it is now recognized by the configuration sensor that the background is no longer white, but dark gray, for example, the control unit can generate a parameter set in which the contrast settings for the productive sensor are changed such that the barcode can also be reliably recognized by the productive sensor against the dark gray background.

The configuration sensor and the productive sensor are preferably configured separately from one another and are e.g. arranged in different housings. The configuration sensor and the productive sensor can furthermore be arranged such that they cannot detect the same workpiece at the same time.

The configuration sensor and the productive sensor are sensors of the same kind, this means sensors that are configured for acquiring and/or outputting the same kind of measurement value and/or that have the same function. Both sensors can, for example, be configured to measure a distance value, to measure the temperature or the brightness or to record an optical image. The configuration sensor and the productive sensor preferably at least substantially have the same construction.

Advantageous further developments of the invention can be seen from the description, from the drawing and from the dependent claims.

In accordance with a first advantageous embodiment, the parameter set is adapted to the current state of the process. This means that the parameter set is adapted to the currently present boundary conditions of the industrial process. The boundary conditions can, for example, comprise the kind of currently processed workpieces, wherein the workpieces can vary from time to time and require respective other parameter sets. In addition, the boundary conditions can comprise the current temperature, the current brightness, the current processing speed of the process and the like.

In accordance with a further advantageous embodiment, the parameter set comprises a data packet having digital data, with the data packet being stored at least partly in a memory of the productive sensor. The parameter set can therefore be digitally transmitted. The configuration included in the parameter set can be stored in a memory of the productive sensor after the reception of the parameter set in the productive sensor and then influences how the productive sensor works. The transmission of the parameter set as a digital data packet permits also arranging the control unit far away from the configuration sensor and from the productive sensor since the digital data packet can also e.g. be transmitted via the internet.

In accordance with a further advantageous embodiment, workpieces machined by the industrial process are detected after one another in time first by the configuration sensor and then by the productive sensor. In addition, the detection of the same workpiece by the configuration sensor and by the productive sensor can take place at different positions of the workpiece. For example, the workpieces can first be guided past the configuration sensor by means of a conveyor belt and can subsequently—for example at a distance of a few centimeters or meters and with a delay of a plurality of seconds—be guided past the productive sensor. On the guiding past, the configuration sensor and the productive sensor can each acquire measurement data of the respective workpieces and transmit them to the control unit. The productive sensor therefore preferably monitors the same process as the configuration sensor.

In accordance with a further advantageous embodiment, the use of the parameter set only takes place after a selected time delay. Due to the transit time that the workpiece requires between the configuration sensor and the productive sensor, it is preferred to only activate the parameter set in the productive sensor shortly (i.e. a predetermined time duration) before the arrival of the respective workpiece. It is possible in this manner that, by means of the productive sensor, previously processed workpieces having the "old" parameter set can still be detected by the productive sensor until the arrival of the workpiece that requires the "new" parameter set.

To achieve the delay, the control unit can transmit the corresponding parameter set with a delay to the productive sensor or the parameter set can include a point in time from which the parameter set should be used by the productive sensor. That the time delay is selected means that the delay is deliberately caused e.g. by the control unit and is not, for example, generated by latencies that are anyway present, etc. Delays or latencies that are anyway present can, however, be considered in the selection of the time delay.

In accordance with a further advantageous embodiment, the time delay is selected with reference to the state of the industrial process. This means that the time delay can e.g. be selected with reference to the current processing speed of the process and/or with reference to the time that the respective workpiece requires from the configuration sensor up to the productive sensor.

In accordance with a further advantageous embodiment, the productive sensor acquires measurement data of the process; the measurement data of the productive sensor are transmitted to the control unit; the control unit generates a parameter set for a further productive sensor with reference to the measurement data of the productive sensor and transmits the parameter set to/based on the further productive sensor, with the further productive sensor using the parameter set in operation. This is called recursive in-process parameterization.

The productive sensor can serve as a configuration sensor for the further productive sensor. It is therefore possible to form a chain of three or more sensors of the same kind that observe the same industrial process and that are preferably arranged along the process. In this respect, a respective one of the sensors arranged upstream in the process can serve as a configuration sensor for a later sensor, with the later sensor then serving as a productive sensor. Continuously improved settings can be implemented along the process by the logical chain designed in this manner, whereby better and better measurement values or measurement data can be generated along the process.

In accordance with a further advantageous embodiment, the control unit is arranged separately from the configuration sensor and from the productive sensor and is coupled to the configuration sensor and/or to the productive sensor by means of a data connection, in particular an Ethernet connection, a fieldbus connection or a USB connection.

The control unit is preferably a server in the internet, in a local network (LAN—Local Area Network), in the cloud or in a so-called fog (this means the control unit is, for example, formed by a local end device).

The control unit can in particular be a service that runs on a server (in the cloud). A scaling capability is possible without a problem due to the use of such a (powerful) server; this means the number of configuration sensors and productive sensors can almost be as large as desired.

Algorithms of machine learning can further preferably be used to generate the parameter set for the productive sensor from the measurement data of the configuration sensor. A feedback loop can be generated for the algorithms used in machine learning, in which feedback loop e.g. a user or a process control system of the process indicates in each case whether the generated parameter set has effected an improvement. The quality of the parameter sets generated by the algorithms of machine learning can be gradually increased in this manner.

In accordance with a further advantageous embodiment, the control unit carries out a data evaluation of the measurement data acquired by the productive sensor. A data evaluation of the measurement data acquired by the configuration sensor can also be carried out in a corresponding manner. The measurement data of both the configuration sensor and the productive sensor can therefore be used for controlling the industrial process. The data evaluation can, for example, be carried out on the server (in the cloud) and can in particular additionally be booked in dependence on the requirement. The data evaluation can hereby be carried out on a computer having a very large computing power, which increases the efficiency and the speed of the data evaluation. The evaluated measurement data can be transmitted, in particular by the control unit, to the process control system of the industrial process.

By transferring the control unit into the cloud, computation-intensive problems such as image processing or similar can also be carried out efficiently and in time or even in real time by means of cloud computing. This is of great importance in particular for dynamic in-process parameterization.

It is of advantage if the control unit is coupled to the process control system (for example, to a programmable logic controller—PLC) of the industrial process. It is likewise possible that the control unit is part of the process control system. The control unit can preferably receive information from the process control system, said information facilitating or improving the generation of the respective parameter set. The control unit can, for example, receive measurement data of other sensors from the process control system such as current temperature values or weight values (e.g. of the workpieces) and/or the current processing speed of the industrial process. The process control system can also communicate to the control unit whether e.g. an illumination is activated or not.

Different kinds of sensors (i.e. of a different kind than the productive sensor) can therefore also be used by means of the process control system to generate measurement data, wherein the generated parameter set is also based on the measurement data of at least one of the different kinds of sensors.

The configuration sensor and the productive sensor can each also be coupled to the process control system, wherein e.g. the process control system forwards the measurement data of the configuration sensor and of the productive sensor to the control unit.

The invention furthermore relates to a system for monitoring an industrial process. The system comprises a configuration sensor, a productive sensor and a control unit. The configuration sensor is configured to acquire measurement data of the process and transmit them to the control unit. The control unit is configured to generate a parameter set for the productive sensor with reference to/based on the measurement data and to transmit the parameter set to the productive sensor. The productive sensor is configured to use the parameter set in operation.

The above explanations with respect to the method in accordance with the invention apply accordingly to the system in accordance with the invention. This in particular applies with respect to advantages and preferred embodiments.

In accordance with an advantageous embodiment of the system in accordance with the invention, the configuration sensor and/or the productive sensor comprises/comprise a respective code reader having a camera. The camera can serve for recording images, wherein the code reader is configured to detect a barcode, a stacked code and/or a 2D matrix code (OR code). The code can respectively be applied to one of the workpieces that are processed by the industrial process.

BRIEF DESCRIPTION OF THE DRAWING

The invention will be described in the following purely by way of example with reference to the drawing. There is shown:

FIG. 1 an industrial process that is observed by means of three sensors.

DETAILED DESCRIPTION

FIG. 1 shows a system 10 that observes an industrial process 12. The industrial process 12 comprises the transporting of packets 14 on a conveyor belt 16 and the sorting of the packets 14. The packets 14 each comprise a barcode (not shown), that should be detected by the system 10, at their upper sides. The sorting (not shown) is carried out with reference to the respective barcode.

The system 10 comprises a configuration sensor 18, a first productive sensor 20 and a second productive sensor 22.

The sensors 18, 20, 22 each comprise a camera for detecting the barcode or for generating images of the barcodes. The sensors 18, 20, 22 each have the same construction and are arranged spaced apart from one another above the conveyor belt 16.

The sensors 18, 20, 22 are each coupled to the internet 26 by means of an Ethernet connection 24. A server that serves as the control unit 28 is likewise coupled to the internet 26 via a data connection 30 such that data communication is possible between the sensors 18, 20, 22 and the control unit 28.

The packets 14 are moved from the left to the right by means of the conveyor belt 16 (in FIG. 1) in the operation of the system 10 and of the industrial process 12. A respective packet 14 (or the barcode present on the packet) is first detected by the configuration sensor 18 in this respect. The configuration sensor 18 generates an image of the respective packet 14 and transmits the image to the control unit 28 via the Ethernet connection 24, the internet 26 and the data connection 30.

The control unit 28 processes the received image and can, for example, determine that it is a black barcode against a white background. The control unit 28 can then generate a parameter set that is optimized with respect to this kind of barcode. The parameter set is then transmitted by the control unit 28 to the first productive sensor 20 (and optionally also to further sensors). As soon as the respective packet 14 has been conveyed by the configuration sensor 18 to the first productive sensor 20, the first productive sensor 20 uses the parameter set received by the control unit 28 such that an optimized result can already be achieved with respect to the detection by the configuration sensor 18. In this respect, the productive sensor 20 likewise generates an image of the respective packet 14 and transmits the image to the control unit 28. If the control unit 28 recognizes further optimization possibilities, the control unit 28, for example, generates a further parameter set and transmits it to the second productive sensor 22 such that an even further optimized result can be implemented there. If no further optimization is possible, the control unit 28 transmits the same parameter set to the second productive sensor 22 as to the productive sensor 20.

The case can occur in operation that the property of the barcode changes, for example, because a barcode has to be processed that has a dark background and that is fastened to a larger packet 14 (as shown in FIG. 1 with the left packet 14). In this case, the control unit recognizes the now changed boundary conditions with reference to the image generated by the configuration sensor 18 (this means with reference to the measurement data of the configuration sensor). The control unit 28 then generates a new parameter set for the first and second productive sensors 20, 22, said parameter set, for example, including changed settings for the contrast of the respective camera and for the focus position of the respective camera. A reliable recognition of the barcode can also be ensured for the larger packet 14 in this manner.

REFERENCE NUMERAL LIST 10 system
12 industrial process 14 packet
16 conveyor belt
18 configuration sensor
20 first productive sensor
22 second productive sensor
24 Ethernet connection
26 internet
28 control unit
30 data connection

The invention claimed is:

1. A method for the dynamic parameterization of at least one sensor in an industrial process, the method comprising the steps of:
acquiring measurement data of the industrial process by means of a configuration sensor and of a productive sensor, with the configuration sensor and the productive sensor being sensors of the same kind and the configuration sensor and productive sensors providing code recognition functions;
transmitting the measurement data of the configuration sensor to a control unit;
the control unit generating a parameter set optimized with respect to a predetermined code configuration based on data sensed by the configuration sensor for the productive sensor based on the measurement data and the control unit transmitting the parameter set to the productive sensor; and
the productive sensor using the parameter set in operation, wherein
the productive sensor acquires measurement data of the process;
the measurement data of the productive sensor are transmitted to the control unit;
the control unit generates a parameter set for a further productive sensor based on the measurement data of the productive sensor and transmits the parameter set to the further productive sensor; and
the further productive sensor uses the parameter set in operation.

2. The method in accordance with claim 1,
wherein the parameter set is adapted to the current state of the process.

3. The method in accordance with claim 1,
wherein the parameter set comprises a data packet having digital data, with the data packet being stored at least partly in a memory of the productive sensor.

4. The method in accordance with claim 1,
wherein workpieces machined by the process are detected after one another in time first by the configuration sensor and then by the productive sensor.

5. The method in accordance with claim 1,
wherein the use of the parameter set only takes place after a selected time delay.

6. The method in accordance with claim 5,
wherein the time delay is selected with reference to the state of the process.

7. The method in accordance with claim 1,
wherein the control unit is arranged separately from the configuration sensor and from the productive sensor and is coupled to at least one of the configuration sensor and the productive sensor by means of a data connection.

8. The method in accordance with claim 7,
wherein the data connection is selected from the group of members consisting of an Ethernet connection, a fieldbus connection and a USB connection.

9. The method in accordance with claim 1,
wherein the control unit is implemented by a service on a cloud server.

10. The method in accordance with claim 1,
wherein algorithms of machine learning are used to generate the parameter set.

11. The method in accordance with claim 1,
wherein the control unit carries out a data evaluation of measurement data acquired by the productive sensor.

12. The method in accordance with claim 1,
wherein the control unit receives information from a process control system of the industrial process, said information facilitating the generation of the parameter set and/or improving the parameter set.

13. A system for monitoring an industrial process, the system comprising
a configuration sensor, a productive sensor and a control unit, the configuration sensor and productive sensors providing code recognition functions, wherein
the configuration sensor is configured to acquire measurement data of the process and to transmit them to the control unit;
the control unit is configured to generate a parameter set optimized with respect to a predetermined code configuration based on data sensed by the configuration sensor for the productive sensor based on the measurement data and to transmit the parameter set to the productive sensor; and
the productive sensor is configured to use the parameter set in operation,
wherein
the productive sensor acquires measurement data of the process;
the measurement data of the productive sensor are transmitted to the control unit;
the control unit generates a parameter set for a further productive sensor based on the measurement data of the productive sensor and transmits the parameter set to the further productive sensor; and
the further productive sensor uses the parameter set in operation.

14. The system in accordance with claim 13,
wherein at least one of the configuration sensor and the productive sensor comprises a code reader having a camera.

15. The system in accordance with claim 13,
wherein the parameter set comprises different sets of parameters for the configuration sensor, the productive sensor and the further productive sensor.

16. A method for the dynamic parameterization of at least one sensor in an industrial process, the method comprising the steps of:
acquiring measurement data of the industrial process by means of a configuration sensor and of a productive sensor, with the configuration sensor and the productive sensor being sensors of the same kind, the configuration sensor and productive sensors providing code recognition functions;
transmitting the measurement data of the configuration sensor to a control unit;
the control unit generating a parameter set optimized with respect to a predetermined code configuration based on data sensed by the configuration sensor for the productive sensor based on the measurement data and the control unit transmitting the parameter set to the productive sensor; and
the productive sensor using the parameter set in operation, wherein
- the productive sensor acquires measurement data of the process;
- the measurement data of the productive sensor are transmitted to the control unit;
- the control unit generates a parameter set for a further productive sensor based on the measurement data of the productive sensor and transmits the parameter set to the further productive sensor;
- the further productive sensor uses the parameter set in operation, and
- the parameter set comprises different sets of parameters for the configuration sensor, the productive sensor and the further productive sensor.

* * * * *